United States Patent [19]

Iff et al.

[11] Patent Number: 4,997,917

[45] Date of Patent: * Mar. 5, 1991

[54] PREPARATION OF 1:2 CHROMIUM COMPLEX AZO DYES ASYMMETRICALLY SUBSTITUTED WITH SOLUBILIZING

[75] Inventors: Walter Iff, Craponne; Daniel Parisot, Saint-Genis-Laval; Hans Schaller, Lyon, all of France

[73] Assignee: Ciba-Geigy Corporation, Ardsley, N.Y.

[ * ] Notice: The portion of the term of this patent subsequent to Jun. 12, 2007 has been disclaimed.

[21] Appl. No.: 707,924

[22] Filed: Mar. 4, 1985

[30] Foreign Application Priority Data

Mar. 8, 1984 [CH] Switzerland ............... 1146/84

[51] Int. Cl.$^5$ ............ C09B 45/02; C09B 45/06; C09B 45/16
[52] U.S. Cl. ............ 534/602; 534/696; 534/697; 534/698; 534/699; 534/887
[58] Field of Search ............ 534/602, 696, 697, 698, 534/699

[56] References Cited

U.S. PATENT DOCUMENTS

| | | | |
|---|---|---|---|
| 3,432,485 | 3/1969 | Neier | 534/602 X |
| 4,234,479 | 11/1980 | Mennicke et al. | 534/698 |
| 4,396,544 | 8/1983 | Dore | 534/602 X |

FOREIGN PATENT DOCUMENTS 151003 9/1981 Fed. Rep. of Germany ...... 534/696
967011 4/1962 United Kingdom .

OTHER PUBLICATIONS

"Metal-Complex Dyes for Wool and Nylon—1930 to Date", Review of Progress in Coloration and Related Topics vol. 14, 1984, pp. 33–42 (Beffa et al.).
Römpps Chemie-Lexikon, Dr. Otto-Albrecht Neumüller (1979).

*Primary Examiner*—Floyd D. Higel
*Attorney, Agent, or Firm*—George R. Dohmann; Edward McC. Roberts; Kevin T. Mansfield

[57] ABSTRACT

The invention relates to a process for the preparation of asymmetrical 1:2 chromium complex dyes of not less than 90% purity and containing at least one water-solubilizing group, which process comprises reacting a mixture of two metallizable azo dyes that contain different diazo components and different coupling components, or a mixture of a metallizable azo dye and a metallizable azomethine dye, in the molar ratio of 0.85:1.0 to 1.2:1.0, with the proviso that only one of said two mixture components contains at least one water-solubilizing group, with a chromium donor, under pressure and at a temperature above 100° C. and in the pH range from 0 to 2, and subsequently carrying out further reaction in a weakly acid, neutral or weakly alkaline pH range, utilizing a single vessel for all steps.

The dyes obtained by the process of the invention are particularly suitable for dyeing wool or polyamide materials.

30 Claims, No Drawings

PREPARATION OF 1:2 CHROMIUM COMPLEX AZO DYES ASYMMETRICALLY SUBSTITUTED WITH SOLUBILIZING

Chromium complex dyes have long been known in the art and are widely used for dyeing and printing textiles made from fibre materials in a very wide range of shades. The known processes for the preparation of 1:1, symmetrical 1:2, mixed 1:2 and and pure asymmetrical 1:2 chromium complex azo dyes and 1:2 chromium complex azo-azomethine dyes differ from one another in characteristic manner. Thus 1:1 chromium complex azo dyes are prepared by metallising the azo dyes, which are present in aqueous solution, with excess chromium (III) salts, while holding the pH at about 1 to 2 in order to prevent the formation of 1:2 complexes. Symmetrical and mixed 1:2 chromium complex azo dyes are normally prepared in aqueous solution in a weakly acid, neutral or weakly alkaline pH range, in which process the mixed 1:2 complexes are composed of the symmetrical and the asymmetrical complex. Up to now, it has only been possible to prepare pure asymmetrical 1:2 chromium complex azo dyes and 1:2 chromium complex azo-azomethine dyes by the addition method from corresponding previously prepared 1:1 chromium complex azo dyes and metal-free azo or azomethine dyes.

Despite the complicated process for their preparation, pure asymmetrical 1:2 chromium complex azo dyes and, in some cases also, 1:2 chromium complex azo-azomethine dyes, have attained great importance, as these dyes afford advantages in mild dyeing methods compared with the 1:1 chromium complexes, advantages with respect to solubility compared with the symmetrical 1:2 chromium complexes, and advantages as regards brilliance of shade compared with the 1:2 chromium mixed complexes. Along with these advantages of the asymmetrical chromium complex dyes goes the complicated multi-step preparatory process: separate preparation of the non-metallised azo dyes, preparation of a 1:1 chromium complex azo dye and isolation thereof, and reaction of the 1:1 complex with the metal-free azo dye or azomethine dye, with strict observance of the quantitative ratios.

The present invention has for its object to provide a novel process for the preparation of substantially pure asymmetrical 1:2 chromium complex azo dyes and 1:2 chromium complex azo-azomethine dyes, which process makes it possible to effect chroming utilising a single vessel for all steps and is thus superior to the two-step chroming method conventionally employed hitherto, and which affords dyes of such purity that they conform to present day requirements with respect to quality.

It has been found that this object is achieved with the process described hereinafter.

Accordingly, the present invention relates to a process for the preparation of asymmetrical 1:2 chromium complex dyes of not less than 90% purity, preferably of 95% purity, and containing at least one water-solubilising group, which process comprises reacting a mixture of two metallisable azo dyes that contain different diazo components and different coupling components, or a mixture of a metallisable azo dye and a metallisable azomethine dye in the molar ratio of 0.85:1.0 to 1.2:1.0 with the proviso that only one of said two mixture components contains at least one water-solubilising group, with a chromium donor, under pressure and at a temperature above 100° C. and in the pH range from 0 to 2, and subsequently carrying out further reaction in a weakly acid, neutral or weakly alkaline pH range, utilising a single vessel for all steps.

Surprisingly, the process of this invention makes it possible to prepare almost pure 1:2 chromium complex azo dyes and 1:2 chromium complex azo-azomethine dyes, by means of a chroming method utilising a single vessel for both chroming steps, which dyes contain less than 10% of symmetrical 1:2 chromium complexes. Compared with the prior art, this single vessel chroming process constitutes a considerable simplification in the preparation of asymmetrical 1:2 chromium complexes.

Particularly preferred embodiments of the process of this invention comprise:
(a) choosing as temperature above 100° C. a temperature in the range from 100° to 150° C., preferably from 125° to 135° C.;
(b) choosing as pH value from 0 to 2 a pH from 0 to 1, preferably 0.3 to 0.7;
(c) carrying out the reaction in a weakly acid, neutral or weakly alkaline pH range at a temperature below 100° C., preferably in the range from 70° to 100° C. and, most preferably in the range from 90° to 95° C.;
(d) choosing as weakly acid, neutral or weakly alkaline pH range a pH range from 5 to 9, preferably from 6 to 8;
(e) using a mixture of two different metallisable dyes as defined herein in the molar ratio of 0.95:1.0 to 1.05:1.0, preferably in the ratio of 1:1;
(f) effecting chroming under a pressure of 1 to 5 bar, preferably of 1 to 3 bar;
(g) using an excess of 1 to 5 mol % of chromium donor.

The reaction of the metal-free dyes with the chromium donor is preferably carried out in aqueous medium in a closed vessel, under pressure.

Suitable chromium donors are chromium salts of inorganic or organic acids, for example chromium(III) fluoride, chromium(III) chloride, chromium(III) carbonate and, in particular, chromium compounds of aliphatic or aromatic oxycarboxylic acids that contain the chromium atom bound in complex linkage, for example lactic acid, citric acid, glycolic acid, tartaric acid and salicyclic acid. If inorganic chromium salts are used in the process of this invention, the chroming is preferably performed in the presence of a catalytic amount of a complexing assistant such as tartaric acid, lactic acid, citric acid or glycolic acid or, in particular, salicyclic acid.

The chroming can, if desired, be performed in the presence of suitable auxiliaries such as salts of inorganic or organic acids, for example sodium or potassium acetate, sodium or potassium carbonate, sodium or potassium bicarbonate.

The procedure for chroming the reaction mixture according to the process of this invention comprises adjusting the pH with a strong acid, preferably an inorganic acid, for example sulfuric acid, to a value from 0 to 2, heating the reaction mixture, under pressure, to a temperature above 100° C. and holding this temperature for a time, preferably from 2 to 10 hours, most preferably from 4 to 8 hours, then cooling the reaction mixture to a temperature preferably below 100° C. and adjusting the pH to a weakly acid, neutral or weakly alkaline value by addition of alkali, for example sodium carbonate, and carrying out the reaction further for a short time, preferably for 10 minutes to 3 hours, most preferably for 30 to 90 minutes. The isolation of the not less than 90% pure asymmetrical 1:2 chromium complex azo dye or 1:2 chromium complex azo-azomethine dye can be effected by methods that are known per se, for example salting out, filtration and subsequent drying.

The dyes obtained by the process of this invention are either in the form of the free acid or, preferably, of salts.

Possible salts are, for example, the alkali metal, alkaline earth metal or ammonium salts or the salts of an organic amine. Examples of such salts are the sodium, lithium, potassium or ammonium salts or the salt of triethanolamine.

Further preferred embodiments of the process of this invention comprise:

(a) starting from two separately prepared azo dyes that meet the requirements specified above;
(b) starting from an azo dye and an azomethine dye that meet the requirements specified above;
(c) using, as azo dyes, monoazo or disazo dyes that contain the diazo components and coupling components of the benzene, naphthalene or heterocyclic series.

The metallisable azo and/or azomethine dyes employed in the process of this invention contain, as metallisable groups, preferably hydroxyl groups and/or carboxyl groups. One of the dyes employed must contain at least one water-solubilising group, for example a sulfone, sulfonamide, N-monoalkylsulfonamide or N,N-dialkylsulfonamide group or, preferably, a sulfonic acid group.

A suitable sulfone group is an alkylsulfone group, preferably a $C_1$-$C_4$alkylsulfone group.

The metallisable azo dyes employed in the process of this invention are preferably monoazo or disazo dyes that contain diazo components and coupling components of the benzene, naphthalene or heterocylic series.

In the process of this invention it is preferred to use a mixture of azo dyes of the formulae

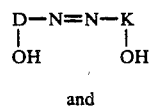

and

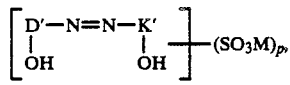

wherein D and D' are each independently of the other a radical of the benzene or naphthalene series which can be substituted by $C_1$-$C_4$alkyl, $C_1$-$C_4$alkoxy, halogen, phenylazo or nitro, and K and K' are each independently of the other a naphthalene or pyrazolone radical which can be substituted by $C_1$-$C_4$alkyl, $C_1$-$C_4$alkoxy, halogen or nitro, and wherein the hydroxyl groups are vicinal to the azo group, M is a cation, and D and D' and K and K' are radicals that differ from one another and p is 1 or 2.

A particularly preferred embodiment of the process of this invention comprises using a dye of formula (1), wherein D is a radical of the benzene series which may be substituted by nitro, phenylazo or chlorine, and K is a 1-phenyl-3-methylpyrazol-5-one radical or a radical of the naphthalene series which may be substituted by chlorine, and a dye of formula (2), wherein D' is a radical of the benzene series which may be substituted by nitro, chlorine, methyl or sulfo, or is a radical of the naphthalene series which is unsubstituted or substituted by sulfo or nitro, and K' is a radical of the naphthalene series which is unsubstituted or substituted by sulfo, or is a 1-phenyl-3-methylpyrazol-5-one radical, which dye of formula (2) contains a single sulfonic acid group.

Further preferred embodiments of the process of this invention for the preparation of 1:2 chromium complex azo-azomethine dyes comprise:

(a) chroming a metallisable azo dye together with an aromatic amine and an o-hydroxyaldehyde, which dye meets the requirements specified above, utilising a single vessel and in accordance with the procedure described above;
(b) using a mixture of the starting dyes of the formulae

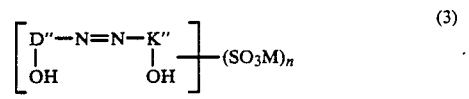

and

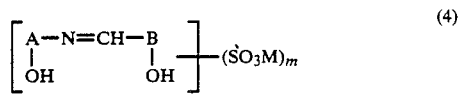

wherein D" and A are each independently of the other a radical of the benzene or naphthalene series which may be substituted by $C_1$-$C_4$alkyl, $C_1$-$C_4$alkoxy, halogen or nitro, K" is a radical of the benzene or naphthalene series or is a pyrazolone radical, each of which may be substituted by $C_1$-$C_4$alkyl, $C_1$-$C_4$alkoxy, halogen or nitro, B is a radical of the benzene or naphthalene series which may be substituted by $C_1$-$C_4$alkyl, $C_1$-$C_4$alkoxy, halogen, nitro or arylazo, preferably phenylazo, and wherein the hydroxyl groups are vicinal to the azo or azomethine group, M is a cation, and each of n and m is 0 or 1 and the sum of n+m is 1.

The azo dyes employed in the process of this invention are known and are prepared by methods which are known per se.

The diazotisation of the diazo components is carried out by methods known per se, for example by treatment with nitric acid in an aqueous solution of mineral acid at low temperature. The coupling to the coupling component is likewise carried out by methods known per se, for example at acid, neutral or alkaline pH values.

Examples of suitable diazo components are those of the benzene or naphthalene series which, in addition to containing the metallisable group and, where appropriate, a water-solubilising group, can also contain further substituents of a non-salt-forming kind, for example nitro groups, halogen atoms such as fluorine, chlorine and bromine, alkyl groups, preferably $C_1$-$C_4$alkyl groups, for example methyl, ethyl, propyl, isopropyl, butyl, isobutyl, sec-butyl and tert-butyl, alkoxy groups, preferably $C_1$-$C_4$alkoxy groups, for example methoxy, ethoxy, propoxy, isopropoxy and butoxy, and azo groups such as the phenylazo group.

Typical examples of such diazo components are: 4- or 5-chloro-2-aminophenol, 4-, 5- or 6-nitro-2-aminophenol, 4,6-dichloro-2-aminophenol, 3,4,6-trichloro-2-aminophenol, 4-chloro-5- or -6-nitro-2-aminophenol, 4-nitro-6-chloro-2-aminophenol, 4,6-dinitro-2-aminophenol, 1-amino-2-hydroxynaphthalene, 2-amino-1-hydroxybenzene-4- or -5-sulfophenylamid, 4-chloro-2- amino-1-hydroxybenzene-5-sulfophenyl-or -N-ethyl-N-phenylamide, 2-aminobenzene-1-carboxylic acid, 2-aminobenzene-1-carboxylic acid 4- or -5-sulfonic acid, 2-aminophenol-4- or -5-sulfonic acid, 4-chloro- or 4-methyl-2-aminophenol-5-or -6-sulfonic acid, 4-nitro-2-aminophenol-6-sulfonic acid, 6-nitro-2-aminophenol-4-sulfonic acid, 2-amino-1-hydroxynaphthalene-4- or -8-sulfonic acid, 6-nitro-1-amino-2-hydroxynaphthalene-4-sulfonic acid, 6-bromo- or 6-methyl-1-amino-2-hydroxynaphthalene-4-sulfonic acid, 1-amino-2-hydroxynaphthalene-4-sulfonic acid, 4-chloro- or 4-nitro-2-aminophenol-6-sulfonamide, 6-nitro-2-aminophenol-4-sulfonamide, 2-aminophenol-4- or -5-sulfo-N-methylamide, 2-aminophenol-4-or -5-sulfo-N-phenylamide, 2-aminophenol-4- or -5-sulfo-N,N-dimethylamide, 4-chloro-2-aminophenol-5-sulfo-N-methyl-, -N-ethyl-, -N-isopropyl- or -N-phenylamide, 4-chloro-2-aminophenol-5-sulfo-N,N-dimethyl-, -N,N-diethyl- or N-methyl-N-phenylamide and the corresponding compounds which contain a methylsulfone, ethylsulfone, phenylsulfone, p-methylphenylsulfone or p-chlorophenylsulfone group instead of a sulfonamido group.

Suitable coupling components are those that are able to couple in the vicinal position to a hydroxyl or carboxyl group. Such coupling components also include keto compounds that are able to couple in the vicinal position to their enolised or enolisable keto group. Suitable coupling components are in particular those of the benzene, naphthalene or heterocyclic series that, in addition to containing the metallisable group and, where appropriate, a water-solubilising group, can contain further substituents of a non-salt-forming kind as described for the diazo components.

Typical examples of such coupling components are: p-cresol, p-tertamylphenol, 1-phenyl-3-methyl-5-pyrazolone, 1-(2'-ethylphenyl)-3-methyl-5-pyrazolone, 1,3-diphenyl-5-pyrazolone, 1-(2'-,3'- or 4'-chlorophenyl)-3-methyl-5-pyrazolone, 1-(2',5'-dichlorophenyl)-3-methyl-5-pyrazolone, 1-(2'-,3'- or 4'-methylphenyl)-3-methyl-5-pyrazolone, 1-n-octyl-3-methyl-5-pyrazolone, 8-hydroxyquinoline, barbituric acid, 6-bromo-, 6-methyl- or 6-methoxy-2-hydroxynaphthalene, 8-chloro-1-hydroxynaphthalene, 5-chloro-1-hydroxynaphthalene, 5,8-dichloro-1-hydroxynaphthalene, 4,8- or 5,8-dichloro-2-hydroxynaphthalene, 2-hydroxynaphthalene, 1-hydroxynaphthalene, 1-phenyl-3-methyl-5-pyrazolone-2'-, -3'- or -4'-sulfonic acid, 1-(2'-chloro-4'-or -5'-sulfophenyl)-3-methyl-5-pyrazolone, 1-(2',5'-dichloro-4'-sulfophenyl)-3-methyl-5-pyrazolone, 1-[naphthyl(1)]-3-methyl-5-pyrazolone-4'-, -5'-, -6'-, -7'- or -8'-sulfonic acid, 1-[naphthyl-(2')]-3-methyl-5-pyrazolone-1'-or -8'-sulfonic acid, 2-hydroxynaphthalene-4-, -5-, -6- or -7-sulfonic acid, 1-hydroxynaphthalene-4-, -5- or -8-sulfonic acid, 1-phenyl-3-methyl-5-pyrazolone-3'-sulfonamide or -N-methylsulfonamide, 2,4-dihydroxyquinoline, 5-chloro-8-hydroxyquinoline, 1-hydroxynaphthalene-4-, -5- or -8-sulfonamide, 2-hydroxynaphthalene-4-, -6- or -7-sulfonamide.

To prepare the azomethine dyes, the above mentioned aromatic amines are condensed with o-hydroxybenzaldehydes or o-hydroxynaphthaldehydes.

Examples of suitable aldehydes are: 2-hydroxybenzaldehyde, 3- or 5-methyl-2-hydroxybenzaldehyde, 3,5- or 3,6-dimethyl-2-hydroxybenzaldehyde, 5-butyl-2-hydroxybenzaldehyde, 5-chloro- or 5-bromo-2-hydroxybenzaldehyde, 3- or 4-chloro-2-hydroxybenzaldehyde, 3,5-dichloro-2-hydroxybenzaldehyde, 3-chloro-5-methyl-2-hydroxybenzaldehyde, 3-methyl-5-chloro-2-hydroxybenzaldehyde, 3- or 4- or 5-nitro-2-hydroxybenzaldehyde, 3,5-dinitro-or 4-chloro-5-nitro-2-hydroxybenzaldehyde, 4-methoxy-2-hydroxybenzaldehyde, 1-hydroxy-2-naphthaldehyde and its derivative which is chlorinated in the 4-position; 2-hydroxy-1-naphthaldehyde; and the above mentioned aldehydes which are further substituted by arylazo groups, in particular by phenylazo groups, e.g. 2-hydroxybenzaldehyde-5-azo-1-benzene-4-azobenzene.

A further embodiment of the process of this invention comprises pretreating, prior to the chroming at pH 0 to 2, a mixture of the above defined metallisable starting dyes in the molar ratio of 0.85:1.0 to 1.2:1.0, with a chromium donor at pH 3 to 4, and subsequently further carrying out the reaction as described above, i.e. under pressure at a temperature above 100° C. and in the pH range from 0 to 2, and then carrying out further reaction at a weakly acid, neutral or weakly alkaline pH value, utilising a single vessel.

An advantage of the above-described pretreatment at pH 3 to 4 of the process of this invention is that, especially when employing starting dyes that react only very slowly at a pH in the range from 0 to 2 with a chromium donor, a shortening of the reaction time is thereby achieved.

The purity of the asymmetrical 1:2 chromium complex dyes obtained by the process of this invention is such as has been previously achieved only with the complexes prepared by the addition method.

1:2 Chromium complexes are obtained in over 95% purity by the process of this invention, especially when using the reactants in a molar ratio of 1:1. Deviations from the molar ratio of 1:1 are used to adjust the desired shade.

The asymmetrical 1:2 chromium complex azo dyes and 1:2 chromium complex azo-azomethine dyes obtained by the process of this invention are suitable for dyeing and printing a very wide range of materials, in particular for dyeing materials of animal origin such as silk, leather and, in particular, wool, and also for dyeing and printing synthetic fibres made from polyamide, polyurethanes or polyacrylonitrile. They are particularly suitable for dyeing from a weakly alkaline, neutral or weakly acidic bath, preferably from a bath containing acetic acid. The dyeings so obtained are level, very brilliant, and have good allround fastness properties, especially good lightfastness and wetfastness properties.

The textile material can be in the most widely different kinds of processing forms, for example in the form of filamernts, yarn, woven and knitted fabrics.

In the following Examples, parts are by weight. The relationship between parts by weight and parts by volume is the same as that between the gram and the cubic centimetre.

EXAMPLE 1:

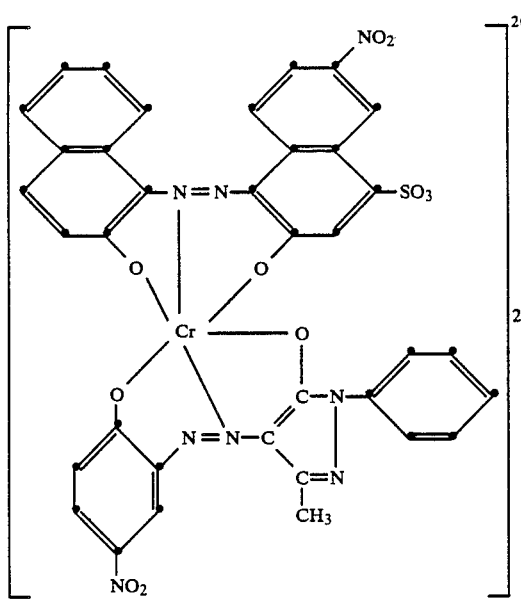

A solution of 44 parts of the azo dye obtained by coupling 6-nitro-1-amino-2-hydroxynaphthalene-4-sulfonic acid with 2-naphthol and 34 parts of the azo dye obtained by coupling 2-amino-4-nitrophenol with 1-phenyl-3-methyl-5-pyrazolone is adjusted with 70% sulfuric acid to pH 1.5 in 1000 parts of water and 2 parts of salicylic acid and 16.6 parts of chromium(III) sulfate [Cr(OH)SO$_4$] are added. The reaction mixture is heated under a pressure of 1.8 to 2 bar to 130° C. and kept at this temperature for 4 hours. The mixture is cooled to 95° C. and adjusted with sodium hydroxide to pH 6 to 7 and then stirred for 1 to 2 hours at 95° C. When the reaction is complete, the dye is salted out with sodium chloride, isolated by filtration and dried. The resultant dye is the 93% pure asymmetrical 1:2 chromium complex. The yield is 95%. The dye, which is readily soluble in water, dyes wool or polyamide in brown shades and gives dyeings of good allround fastness properties.

EXAMPLE 2:

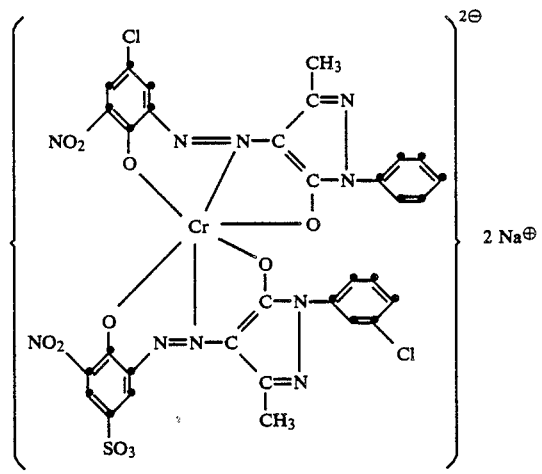

The procedure of Example 1 is repeated, using 46 parts of the azo dye of the formula

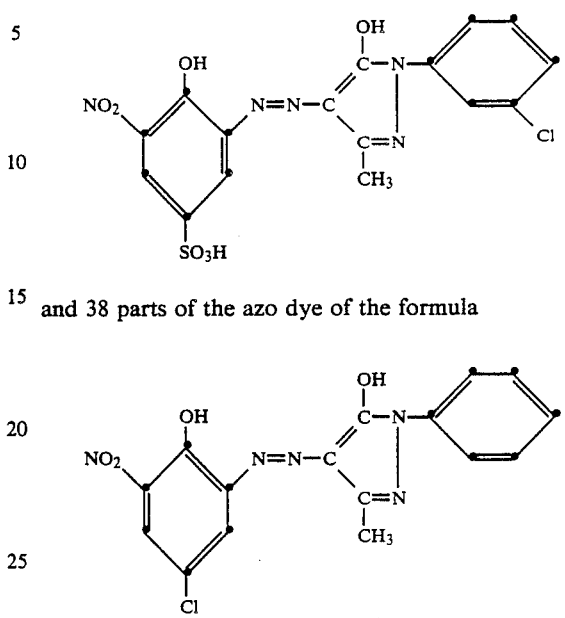

and 38 parts of the azo dye of the formula instead of the azo dyes employed in Example 1. The resultant dye of the above constitution dyes wool or polyamide in red shades. It is the 91% pure 1:2 chromium complex. The yield is 90%.

EXAMPLE 3:

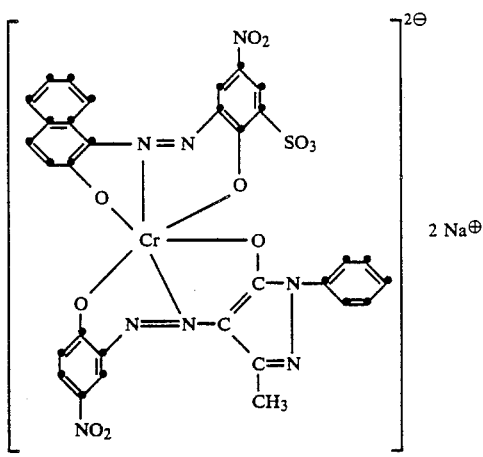

The procedure of Example 1 is repeated, using 40 parts of the azo dye of the formula

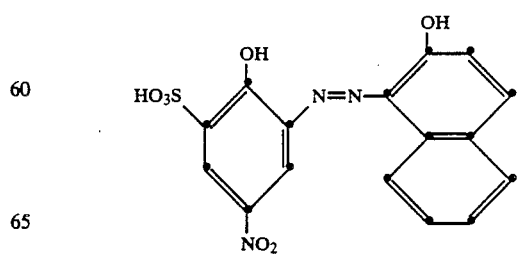

and 34 parts of the azo dye of the formula

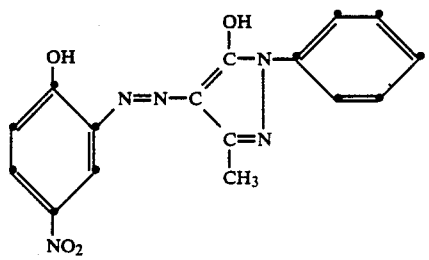

instead of the azo dyes employed in Example 1, and adjusting to pH 0.5 instead of pH 1.5. The resultant dye of the above constitution dyes wool or polyamide in reddish brown shades. It is the 95% pure 1:2 chromium complex. The yield is 90%.

EXAMPLE 4:

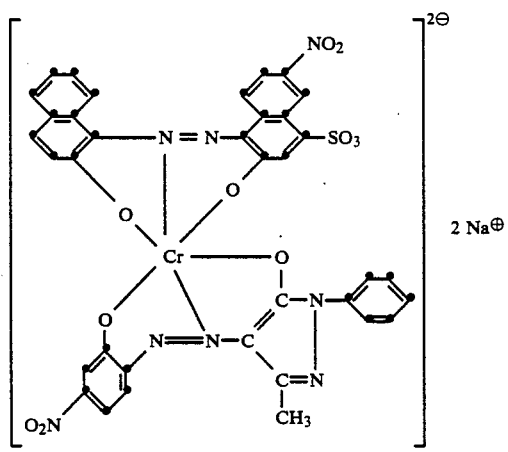

The procedure of Example 1 is repeated, using 44 parts of the azo dye of the formula

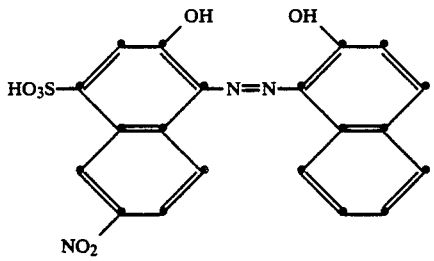

and 34 parts of the azo dye of the formula

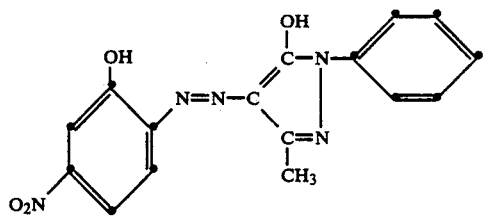

instead of the azo dyes employed in Example 1, and adjusting to pH 1 instead of pH 1.5. The resultant dye of the above constitution dyes wool or polyamide in dark brown shades. It is the 95% pure 1:2 chromium complex. The yield is 95%.

EXAMPLE 5:

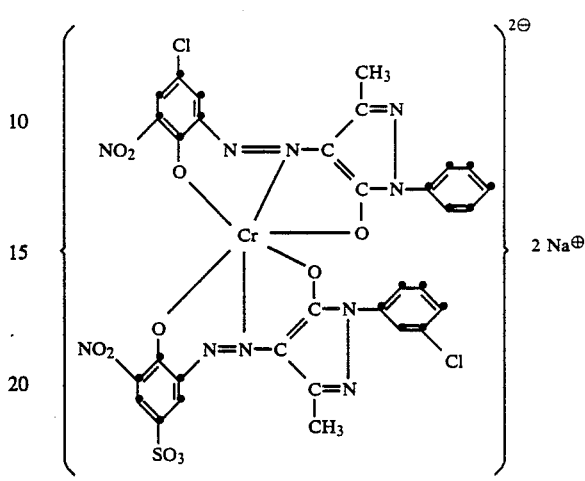

A solution of 46 parts of the azo dye of formula

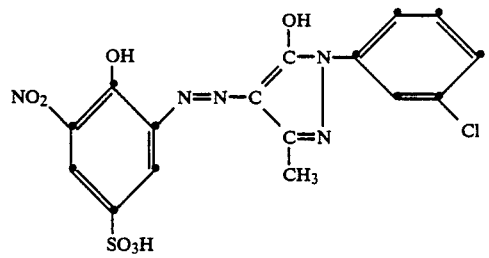

and 38 parts of the azo dye of formula

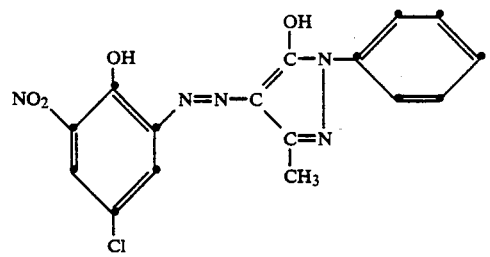

is adjusted with 70% sulfuric acid to pH 3.5 in 1000 parts of water and then 2 parts of salicylic acid and 16.6 parts of chromium (III) sulfate [Cr(OH)SO$_4$] are added. The mixture is stirred at pH 3.5 until no more metal-free azo dye can be detected. Then the mixture of 1:2 chromium complexes so obtained is adjusted with 70% sulfuric acid to pH 0.5 and heated to 135° C. under a pressure of 1.8 to 2 bar and kept at this temperature for 4 hours. The mixture is then cooled to 95° C. and adjusted to pH 7 with sodium hydroxide, then stirred for 1 to 2 hours at 95° C. When the reaction is complete, the dye is salted out with sodium chloride, isolated with filtration and dried. The resultant dye is the 91% pure asymmetrical 1:2 chromium complex. The yield is 90%. The dye so obtained of the above constitution dyes wool or polyamide in red shades.

EXAMPLE 6:

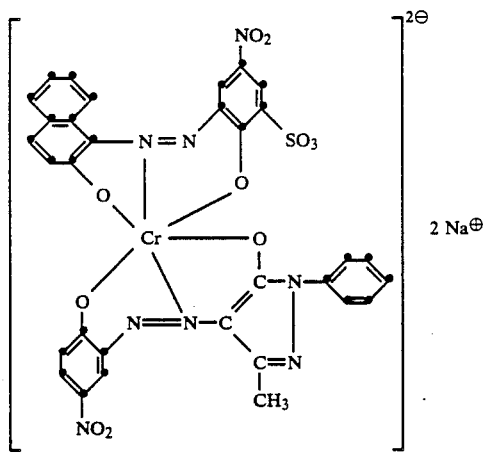

The procedure of Example 5 is repeated, using 40 parts of the azo dye of the formula

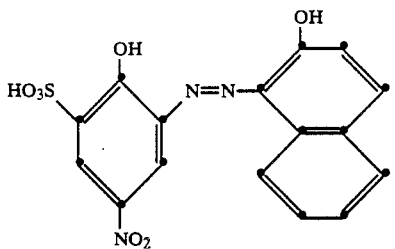

and 34 parts of the azo dye of the formula

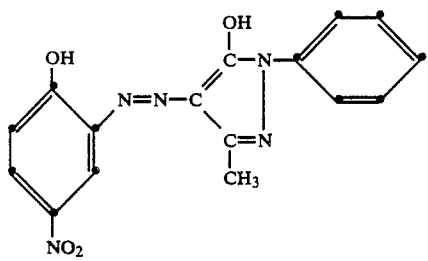

instead of the azo dyes employed in Example 5, and adjusting to pH 1 instead of pH 0.5. The resultant dye of the above constitution dyes wool or polyamide in reddish brown shades. It is the 95% pure 1:2 chromium complex. The yield is 90%.

Dyeing Procedure for Wool 4 parts of the chromium complex dye of Example 1 are dissolved in 4000 parts of water and then 100 parts of thoroughly wetted wool are put into this dye bath at 40°-50° C.

Then 2 parts of 40% acetic acid are added and the bath is heated over ½ hour to the boil and kept for ¾ hour at boiling temperature. The wool is then rinsed with cold water and dried. The brown dyeing has good wet-fastness properties and excellent light-fastness.

Dyeing Procedure for Polyamide 100 parts of nylon 6,6 fabric are put at 50°-60° C. into a dye bath that consists of 3000 parts of water, 5 parts of 40% acetic acid, 10 parts of sodium sulfate and 2 parts of the chromium complex of Example 1. After the bath has been heated to the boil over ½ hour, dyeing is carried out for a further hour at boiling temperature. The fabric is then rinsed and dried, affording a level brown dyeing.

What is claimed is:

1. A process for preparing an asymmetrical 1:2 chromium: dye complex dye containing at least one water-solubilizing group, which process comprises:
   a. preparing a mixture of two metallizable azo dyes containing different diazo components and different coupling components or of a metallizable azo dye and a metallizable azomethine dye wherein said dyes are in a molar ratio ranging from 0.85:1.0 to 1.2:1.0, with the proviso that only one of said dyes contains at least one water solubilizing group;
   b. reacting, at a pH of from 0 to 2, at a pressure greater than one atmosphere, and at a temperature greater than 100° C., said mixture with a chromium donor; and
   c. adjusting the pH to a value of from 5 to 9;
with the provisos that a single reaction vessel is utilized for all steps and the reactant amounts in steps (a) and (b) and the times, temperatures and pressures of steps (b) and (c) are selected to produce the 1:2 asymmetric chrome: dye complex in a purity of at least 90%.

2. A process according to claim 1 wherein step (b) is conducted at a temperature no higher than 150° C.

3. A process according to claim 2 wherein said temperature is from 125° C. to 135° C.

4. A process according to claim 1 wherein the pH of step (b) is a value of from 0 to 1.

5. A process according to claim 4 wherein the pH is a value of from 0.3 to 0.7.

6. A process according to claim 1 wherein the temperature of step (c) is 70° C. to 100° C.

7. A process according to claim 6 wherein the temperature is 90° C. to 95° C.

8. A process according to claim 1 wherein the pH in step (c) is adjusted to a value ranging from 6 to 8.

9. A process according to claim 1 wherein the molar ratio of dyes in step (a) ranges in value from 0.95:1.0 to 1.05:1.0.

10. A process according to claim 9 wherein the molar ratio of dyes is 1:1.

11. A process according to claim 1 wherein the pressure of step (b) is greater than 1 bar but no more than 5 bar.

12. A process according to claim 11 wherein the pressure is no more than 3 bar.

13. A process according to claim 1 wherein the amount of chromium donor used is in an excess of 1 to 5 mol %.

14. A process according to claim 1 wherein step (b) is carried out in the presence of a catalytic amount of a complexing assistant selected from the group consisting of tartaric acid, lactic acid, citric acid, glycolic acid or salicylic acid.

15. A process according to claim 1 wherein step (b) is conducted in aqueous medium.

16. A process according to claim 1 wherein the pH of the mixture of step (a) is from 3 to 4 and the pH of the reactant mixture after combination of the mixture of step (a) and the chromium donor is adjusted to a value of from 0 to 2.

17. A process according to claim 1 wherein said chromium donor is selected from the group consisting of chromium (III) fluoride, chloride, carbonate, sulfate, lactate, citrate, glycolate, tartrate and salicylate.

18. A process according to claim 1 which comprises mixing two separately prepared azo dyes in step (a).

19. A process according to claim 1 which comprises mixing an azo and an azomethine dye in step (a).

20. A process according to claim 1, wherein said azo dyes are monoazo or disazo dyes that contain, as diazo components and coupling components, benzene, naphthalene or heterocyclic radicals.

21. A process according to claim 1, wherein said azo or azomethine dyes contain hydroxyl or carboxyl groups as metallisable groups.

22. A process according to claim 1, wherein said azo or azomethine dyes contain a sulfone, sulfonamide, N-monoalkylsulfonamide or N,N-dialkylsulfonamide or sulfonic acid group as water-solubilising group.

23. A process according to claim 22 wherein said dyes contain a sulfonic acid group.

24. A process according to claim 20, wherein said dyes are a mixture of azo dyes of the formula

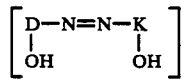

and

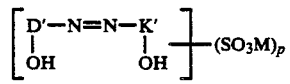

wherein D and D' are each independently of the other a benzene or naphthalene radical which is unsubstituted or substituted by $C_1$-$C_4$alkyl, $C_1$-$C_4$alkoxy, halogen, phenylazo or nitro, and K and K' are each independently of the other a naphthalene or pyrazolone radical which is unsubstituted or substituted by $C_1$-$C_4$alkyl, $C_1$-$C_4$alkoxy, halogen or nitro, and wherein the hydroxyl groups are vicinal to the azo group, M is a cation, and D and D' and K and K' are radicals that differ from one another and p is 1 or 2.

25. A process according to claim 24, wherein D is a benzene radical which is unsubstituted or substituted by nitro, phenylazo or chlorine, and K is a 1-phenyl-3-methylpyrazol-5-one or naphthalene radical, which is unsubstituted or substituted by chlorine, D' is a benzene radical which is unsubstituted or substituted by nitro, chlorine, methyl or sulfo, or is a naphthalene radical which is unsubstituted or substituted by nitro or sulfo, and K' is a 1-phenyl-3-methyl-pyrazol-5-one radical, or a naphthalene radical with the proviso that the dye with D' contains a single sulfonic acid group.

26. A process according to claim 1 which comprises mixing in step (a) dyes of the formulae

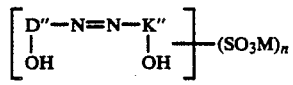

and

-continued

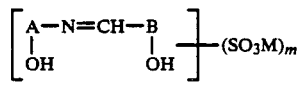

wherein D" and A are each independently of the other a benzene or naphthalene radical which is unsubstituted or substituted by $C_1$-$C_4$alkyl, $C_1$-$C_4$alkoxy, halogen or nitro, K" is a benzene or naphthalene radical or is a pyrazolone radical, each of which is unsubstituted or substituted by $C_1$-$C_4$alkyl, $C_1$-$C_4$alkoxy, halogen or nitro, B is a benzene or naphthalene radical which is unsubstituted or substituted by $C_1$-$C_4$alkyl, $C_1$-$C_4$alkoxy, halogen, nitro or arylazo, and wherein the hydroxyl groups are vicinal to the azo or azomethine group, M is a cation, and each of n and m is 0 or 1 and the sum of n+m is 1.

27. A process according to claim 1, wherein a symmetrical 1:2 chromium complex dye is obtain in at least 95% purity.

28. A process according to claim 26 wherein said arylazo dye is a phenylazo dye.

29. A process for preparing an asymmetrical 1:2 chromium: dye complex containing at least one water-solubilizing group, which process comprises:
  a. preparing a mixture, having a pH of from 3 to 4, of two metallizable azo dyes containing different diazo components and different coupling components in a molar ratio ranging from 0.95:1.0 to 1.05:1.0, with the proviso that only one of said two azo dyes contains at least one water solubilizing group;
  b. reacting, at a pH of from 0 to 2, at a pressure greater than one bar and no more than 5 bar, and at a temperature greater than 100° C. and no more than 150° C., said mixture with a chromium donor; and
  c. adjusting the pH of the resulting reaction mixture to a value of from 5 to 9;
with the provisos that a single reaction vessel is utilized for all steps and the reactant amounts in steps (a) and (b) and the times, temperatures and pressures of steps (b) and (c) are selected to produce the 1:2 asymmetric chrome: dye complex in a purity of at least 90%.

30. A process of preparing an asymmetrical 1:2 chromium: azo-azomethine dye complex containing at least one water-solubilizing group, which process comprises:
  a. reacting, at a pH of from 0 to 2, at a pressure greater than one atmosphere, and at a temperature greater than 100° C., a chromium donor with a metallizable azo dye, an aromatic amine and an o-hydroxyaldehyde in amounts providing an azo:azomethine dye ratio ranging from 0.85:1.0 to 1.2:1.0, with the provisos that only one of said dyes contains at least one water solubilizing group and that the azo and coupling components of said dyes are different, and
  b. adjusting the pH to a value of from 5 to 9;
with the provisos that a single reaction vessel is utilized for all steps and the reactant amounts in steps (a) and the times, temperatures and pressures of steps (a) and (b) are selected to produce the 1:2 asymmetric chrome: dye complex in a purity of at least 90%.

* * * * *